(12) United States Patent
Tangredi et al.

(10) Patent No.: US 12,523,555 B2
(45) Date of Patent: Jan. 13, 2026

(54) ANALOG FRONTEND ARCHITECTURE FOR A CAPACITIVE PRESSURE SENSOR

(71) Applicant: Robert Bosch GmbH, Stuttgart (DE)

(72) Inventors: Domenico Tangredi, Milan (IT); Filippo David, Milan (IT); Gabriele Cazzaniga, Rosate (IT); Manuel Salvatore Santoro, Milan (IT); Massimiliano Musazzi, Como (IT)

(73) Assignee: ROBERT BOSCH GMBH, Stuttgart (DE)

( * ) Notice: Subject to any disclaimer, the term of this patent is extended or adjusted under 35 U.S.C. 154(b) by 302 days.

(21) Appl. No.: 18/255,357

(22) PCT Filed: Nov. 16, 2021

(86) PCT No.: PCT/EP2021/081768
§ 371 (c)(1),
(2) Date: May 31, 2023

(87) PCT Pub. No.: WO2022/122310
PCT Pub. Date: Jun. 16, 2022

(65) Prior Publication Data
US 2024/0019320 A1      Jan. 18, 2024

(30) Foreign Application Priority Data
Dec. 9, 2020   (DE) .................. 10 2020 215 511.9

(51) Int. Cl.
*G01L 1/14*       (2006.01)
*G01D 5/24*      (2006.01)
(Continued)

(52) U.S. Cl.
CPC ............... *G01L 1/144* (2013.01); *G01D 5/24* (2013.01); *G01L 9/12* (2013.01); *H03M 1/124* (2013.01)

(58) Field of Classification Search
CPC . G01D 5/24; G01L 1/144; G01L 9/12; H03M 1/124
(Continued)

(56) References Cited

U.S. PATENT DOCUMENTS 9,319,003 B2 *   4/2016   Chen .................... H03F 1/34
9,778,074 B2 *   10/2017  Schulte ................. G01D 5/24
(Continued)

FOREIGN PATENT DOCUMENTS

CN           105116232 A      12/2015
DE      102015008485 A1       1/2017
(Continued)

OTHER PUBLICATIONS

International Search Report for PCT/EP2021/081768, Issued Feb. 28, 2022.

*Primary Examiner* — Peter J Macchiarolo
*Assistant Examiner* — Monica S Young
(74) *Attorney, Agent, or Firm* — NORTON ROSE FULBRIGHT US LLP (57) ABSTRACT

An analog frontend architecture for a capacitive pressure sensor. The analog frontend architecture includes a low-noise amplifier unit for low-noise amplification of sensor signals of the capacitive pressure sensor, the low-noise amplifier unit including a first integrator unit and a second integrator unit, the first integrator unit being connected to input terminals of the low-noise amplifier unit, being designed as a boxcar integrator, and being configured to amplify sensor signals of the capacitive pressure sensor according to the boxcar integration technique, and the second integrator unit being connected to output terminals of the low-noise amplifier unit and being configured to integrate the amplified voltage signals of the first integrator unit.

9 Claims, 5 Drawing Sheets

(51) Int. Cl.
*G01L 9/12* (2006.01)
*H03M 1/12* (2006.01)

(58) Field of Classification Search
USPC ................................... 73/862.626
See application file for complete search history.

(56) References Cited

U.S. PATENT DOCUMENTS

| | | | | |
|---|---|---|---|---|
| 2016/0011014 A1* | 1/2016 | Entringer | ............... | G01P 15/125 |
| | | | | 324/661 |
| 2016/0105196 A1* | 4/2016 | Pavlovic | ............... | H03M 3/486 |
| | | | | 375/340 |
| 2016/0294332 A1* | 10/2016 | Quilligan | ................... | H03F 1/26 |
| 2019/0068146 A1* | 2/2019 | Raman | ................. | H03F 3/45753 |
| 2023/0100447 A1* | 3/2023 | Lanniel | ................ | H03K 17/975 |
| | | | | 324/686 |

FOREIGN PATENT DOCUMENTS

| | | |
|---|---|---|
| DE | 102020203036 A1 | 9/2021 |
| EP | 2428774 A1 | 3/2012 |

* cited by examiner

ANALOG FRONTEND ARCHITECTURE FOR A CAPACITIVE PRESSURE SENSOR

FIELD

The present invention relates to an analog frontend architecture for a capacitive pressure sensor.

BACKGROUND INFORMATION

Pressure sensors are widely used in automotive and consumer applications. In the past, pressures sensors based on piezo-resistive materials were used. In recent times, capacitive pressure sensors based on micro-electromechanical systems (MEMS) have become increasingly popular. The wide use thereof in smartphones, smart watches, wearables and IoT takes advantage of their main benefits: the optimized noise and power consumption and improved TCO performance. MEMS sensors are used together with an electronic interface circuit, which enables accurate measurement of the measured pressure. To connect analog sensor systems to digital systems, analog frontend architectures AFE are normally used, which serve to amplify the sensor signals and enable the analog sensor signals to be converted into digital signals. In most AFE architectures for MEMS sensors, the first amplifier is the most critical block in terms of noise and performance. Conventional solutions use linear amplifiers, which are configured as charge-voltage converters, with capacitive feedback. Such a simple architecture suffers due to the high bandwidth of the charge-voltage converter with output noise aliasing caused by the sampling of the following analog-digital converter, which is needed for a low residual error in the transient response.

An object of the present invention is to provide an improved analog frontend architecture for a capacitive pressure sensor.

This object may be achieved by the method and the system according to the present invention. Advantageous configurations of the present invention are disclosed herein.

According to an aspect of the present invention, an analog frontend architecture for a capacitive pressure sensor having a low-noise amplifier unit for low-noise amplification of sensor signals of the capacitive pressure sensor is provided, the low-noise amplifier unit comprising a first integrator unit and a second integrator unit, the first integrator unit being connected to input terminals of the low-noise amplifier unit, being designed as a boxcar integrator and being configured to amplify the input signals of the low-noise amplifier unit according to the boxcar integration technique, and the second integrator unit being connected to output terminals of the low-noise amplifier unit and being configured to integrate the amplified voltage signals of the first integrator unit.

Consequently, a technical advantage may be achieved that an improved frontend architecture for capacitive pressure sensors may be provided. Low-noise amplification of the sensors signals of the capacitive pressure sensor is enabled by the low-noise amplifier unit. The combination of the first integrator unit, designed as a boxcar integrator, and the second integrator unit enables improved noise and operating performance. Moreover, by using the boxcar integration technique in a closed loop architecture, high stability, reproducibility, and accuracy of the signal amplification of the sensor signals may be achieved, the signal amplification precisely reproducing the voltage signals of the pressure sensor. The use of the boxcar integration technique furthermore enables the reduction in aliasing of the first amplifier designed as an integrator transconductor amplifier and improves the noise-power ratio of the first integrator transconductor amplifier.

According to a specific embodiment of the present invention, the low-noise amplifier unit is configured in a negative closed loop architecture and comprises a feedback unit, which is designed to feed an electrical charge proportionally to the amplified voltage signals from the output of the second integrator unit back into input terminals of the low-noise amplifier unit.

Consequently, a technical advantage may be achieved that, via the amplified voltage signals at the input terminals of the low-noise amplifier unit, a change in voltage at the input terminals of the low-noise amplifier unit based on the balancing of the charge which has been fed-in by the connected capacitive pressure sensor and the charge from the LNA feedback may be reduced if the negative loop is conceived accurately. Consequently, a non-linear amplification behavior of the low-noise amplifier unit, which is caused by an erratic increase in the voltage signals applied at the input terminals, may be reduced or prevented. Consequently, an improved amplification behavior may be achieved.

According to a specific embodiment of the present invention, the feedback unit comprises at least one feedback switching element, it being possible, via the feedback switching element, to suppress the influence of high-frequency sampling of an analog-digital converter connected to the output of the low-noise amplifier unit.

Consequently, the technical advantage may be achieved that negative influences of the high-frequency sampling of an analog-digital converter of the low-noise amplifier unit, which is connected to the analog frontend architecture, may be covered by the feedback unit. Consequently, the amplification behavior may in turn be improved.

According to a specific embodiment of the present invention, the feedback unit comprises at least one feedback capacitor element, it being possible, via the feedback capacitor element, to match the amplified voltage signals of the second integrator unit, which are fed back into the low-noise amplifier unit, to the charge signals of a capacitive pressure sensor connected to the input terminals of the low-noise amplifier unit.

Consequently, a technical advantage may be achieved that, via the feedback capacitor element, the voltage signals which are fed into the input terminals of the low-noise amplifier unit via the feedback unit may be matched to the voltage signals of the capacitive pressure sensor. Over a plurality of integration cycles of the low-noise amplifier unit, the LNA negative loop matches the charge which is fed into the input terminals via the feedback unit to the value of the charge which is fed in by the capacitive pressure sensor. Consequently, a voltage difference between the voltage signals of the capacitive pressure sensor and the voltage which is applied at the input terminals of the low-noise amplifier unit may be reduced to zero, whereby a direct linear behavior of the low-noise amplifier unit may be achieved, which in turn enables an optimum amplification behavior of the low-noise amplifier unit.

According to a specific embodiment of the present invention, the first integrator unit comprises a transconductor, the integrator unit comprising an operative transconductor amplifier.

Consequently, the technical advantage may be achieved that a reliable, precise and low-noise amplifier behavior may be achieved via the transconductor of the first integrator unit and the operative transconductor amplifier of the second integrator unit.

According to a specific embodiment, the first integrator unit comprises a transconductor, a demodulator unit having a multiplicity of demodulator switching elements and at least one integrator capacitor element, the first integrator unit being connected to the following integrator unit through the joint use of the integrator capacitor element.

Consequently, a technical advantage may be achieved that an improved and low-noise amplification behavior of the first integrator unit and the second integrator unit connected thereto is enabled. The boxcar integration technique may be realized with any desired integration frequency via the demodulator unit and the multiplicity of demodulator switching elements.

According to a specific embodiment of the present invention, the analog frontend architecture furthermore comprises a multiplexer unit connected to the low-noise amplifier unit, it being possible for sensor signals of a temperature sensor to be fed into the analog frontend architecture via the multiplexer unit.

Consequently, a technical advantage may be achieved that sensor signals of the capacitive pressure sensor and also sensor signals of an additional temperature sensor may be amplified and processed by the analog frontend architecture. The analog frontend architecture therefore enables simultaneous processing of different sensor signals, thereby enabling an improved measuring behavior of the capacitive pressure sensor. By taking into account the sensor signals of the temperature sensor, it is therefore possible to realize compensation of the pressure sensor values of the capacitive pressure sensor. This increases the applicability of the analog frontend architecture according to the invention.

According to a specific embodiment of the present invention, the analog frontend architecture furthermore comprises a double sampling unit having a multiplicity of sampler switching elements, it being possible to change polarity between output terminals of the capacitive pressure and temperature sensors and input terminals of the low-noise amplifier unit.

Consequently, it is possible to achieve the technical advantage of enabling any remaining residual offsets of the analog frontend architecture to be removed using correlating double sampling techniques. This promotes the measuring accuracy of the pressure or temperature sensors.

According to a specific embodiment of the present invention, the analog frontend architecture can be operated continuously or with a configurable operating duty cycle.

Consequently, a technical advantage may be be achieved that greater applicability of the analog frontend architecture is enabled since this can be operated both continuously and with an individually configurable operating duty cycle.

According to a specific embodiment of the present invention, the analog frontend architecture is compatible with a capacitive MEMS pressure sensor, in particular with a capacitive MEMS pressure sensor with a full capacitive Wheatstone bridge or with a half capacitive Wheatstone bridge or with a single active capacitance and with or without a reference capacitance.

Consequently, a technical advantage may be achieved that an analog frontend architecture with the widest possible applicability may be provided.

Exemplary embodiments of the present invention are explained with the aid of the figures.

DETAILED DESCRIPTION OF EXAMPLE EMBODIMENTS

Figure 1:
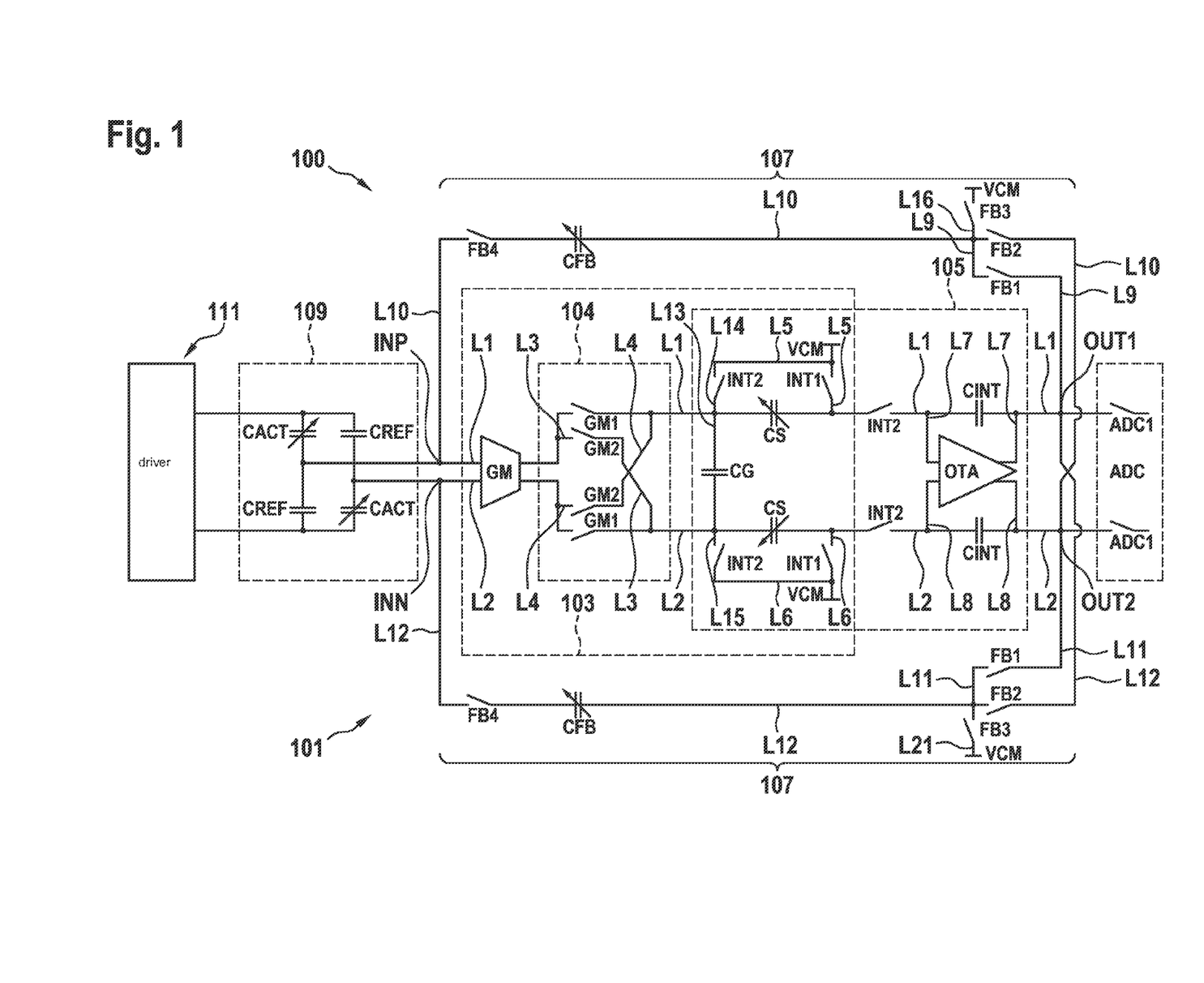
FIG. 1 shows a schematic illustration of an analog frontend architecture according to a specific embodiment of the present invention.

FIG. 1 shows a schematic illustration of an analog frontend architecture 100 according to a specific embodiment.

In the illustrated specific embodiment, the analog frontend architecture 100 comprises a low-noise amplifier unit 101. The low-noise amplifier unit 101 comprises a first integrator unit 103, designed as a boxcar integrator, and a second integrator unit 105. The analog frontend architecture 100 is furthermore configured in a closed loop architecture and comprises a feedback unit 107.

In the specific embodiment shown, the first integrator unit 103 comprises a transductor Gm and a demodulator unit 104 and two integrator capacitor elements CG and CS. The second integrator unit 105 comprises an operative transconductor amplifier OTA, which is designed as a change capacitance integrator.

In the specific embodiment shown, the analog frontend architecture 100 is connected to a capacitive pressure sensor 109, which is connected to the analog frontend architecture 100 via first and second input terminals INP, INN. The capacitive pressure sensor 109 is activated via a driver 111. The capacitive pressure sensor 109 is designed as a capacitive Wheatstone bridge and comprises two sensor capacitor elements CACT and two reference capacitor elements CREF.

In the analog frontend architecture 100, the LNA low-noise amplifier unit 101 is furthermore connected to the analog-digital converter ADC via first and second output terminals OUT1 and OUT2. The analog-digital converter ADC comprises two converter switching elements ADC1.

The transconductor Gm is connected to the first input terminal INP via a first line L1 and to the second input terminal INN via a second line L2. The demodulator unit 104 is connected both to the transconductor Gm and to the integrator capacitor elements CG and CS of the first integrator unit 103 via the first line L1 and the second line L2. The operative transconductor amplifier OTA is connected to the first output terminal OUT1 via the first line L1 and to the second output terminal OUT2 of the LNA low-noise amplifier unit 101 of the analog frontend architecture 100 via the second line L2.

The demodulator unit 104 comprises two first demodulator switching elements GM1, which are each arranged in the first line L1 and the second line L2. The demodulator unit 104 furthermore comprises two second demodulator switching elements GM2, which are each arranged in a third line L3 and a fourth line L4. The third line L3 and the fourth line L4 here produce a cross connection between the first line L1 and the second line L2.

The second integrator unit 105 furthermore comprises two first integrator capacitor elements CS and two integrator capacitor elements CINT, which are each arranged in pairs in the first line L1 and the second line L2. The operative transconductor amplifier OTA is connected to the first line L1 and the second line L2 in each case via a seventh line L7 and an eighth line L8, the seventh line L7 having two connecting points to the first line L1 and the eighth line L8 having two connecting points to the second line L2. The second integrator capacitor elements CINT are each arranged between the two connecting points of the seventh line L7 to the first line L1 and between the two connecting points of the eighth line L8 to the second line L2.

The first integrator unit 103 and the second integrator unit 105 are each connected via an integrator capacitor element CG. The integrator capacitor element CG is arranged in a thirteenth line L13, which produces a connection between the first line L1 and the second line L2 in each case.

A first integrator switching element INT1 is furthermore connected to the first line L1 and a common mode voltage VCM via a fifth line L5. A fourteenth line L14 produces a connection between the second integrator switching element INT2 and the first line L1 and a common mode voltage VCM.

A further first integrator switching element INT is furthermore connected to the second line L2 and a common mode voltage VCM via a sixth line L6.

A fifteenth line L15 produces a connection between a further second integrator switching element INT2 and the second line L2 and a common mode voltage VCM. A first integrator capacitor element CS is arranged in the first line L1 between the connecting points of the first line L1 to the fifth line L5 and the fourteenth line L14 and a further first integrator capacitor element CS is arranged in the second line L2 between the connecting points of the second line L2 to the sixth line L6 and the fifteenth line L15.

The feedback unit 107 comprises a tenth line L10, which represents a connection of the second output terminal OUT2 to the first input terminal INP, and a twelfth line L12, which represents a connection between the first output terminal OUT1 and the second input terminal INN. The feedback unit 107 furthermore comprises a ninth line L9, which represents a connection between the first output terminal OUT1 and the tenth line L10, and an eleventh line L11, which represents a connection between the second output terminal OUT2 and the twelfth line L12. In the tenth line L10, the feedback unit 107 furthermore has a second feedback switching element FB2, a fourth feedback switching element FB4 and a feedback capacitor element CFB. In the twelfth line L12, the feedback unit 107 analogously has a second feedback switching element FB2, a fourth feedback switching element FB4 and a feedback capacitor element CFB. The fourth feedback switching elements FB4 are each arranged between the feedback capacitor element CFB and the input terminal INP, INN. A first feedback switching element FB1 is furthermore arranged in the ninth line L9 and the eleventh line L11 in each case. Moreover, the feedback unit 107 furthermore has a sixteenth line L16 and a seventeenth line L17, the sixteenth line L16 representing a connection between the tenth line L10 and a further common mode voltage VCM and having a third feedback switching element FB3, and the seventeenth line L17 representing a connection between the twelfth line L12 and a further common mode voltage VCM and having a third feedback switching element FB3.

After a plurality of switching cycles of the first integrator unit 103 and the second integrator unit 105, the charge fed into the input terminals of the frontend architecture 100 by the feedback unit 107 perfectly compensates the signal charge of the capacitive pressure sensor 109, which is likewise applied at the first and second input terminals INN, INP. A negative influence of the high-frequency sampling of the high-frequency sampling executed by the analog-digital converter ADC may furthermore be prevented during the feedback of the feedback unit 107. The feedback via the feedback unit 107: that is to say the feeding of the fed-back voltage into the input terminals of the analog frontend architecture 100, may be matched to the boxcar integration frequency via the first to third feedback switching elements FB1, FB2, FB3.

The first integrator capacitor element CS and the feedback capacitor element CFB may be designed, in particular, as adjustable capacitors, whereby tuning of the individual switching and capacitor elements is enabled and optimal amplification by the low-noise amplifier unit 101 may be achieved.

Based on the voltage signals applied at the first and second input terminals INP, INN, the transconductor Gm generates corresponding current values, which are integrated over an integration time TG and charge the integrator capacitor element CG accordingly. After the end of the integration time TG, the charge of the integrator capacitor element CG is discharged into the operative transconductor amplifier OTA. Consequently, corresponding integration of the voltage signals of the pressure and temperature sensors may be achieved. The integration time TG may be configured as desired via the corresponding switching behavior of the first and second demodulator switching elements GM1, GM2. A switching behavior of the first and second integrator switching elements INT1, INT2 and the first to fourth feedback switching elements FB1, FB2, FB3, FB4 may be matched to the switching behavior of the first and second demodulator switching elements GM1, GM2. Moreover, the first integrator capacitor elements CS and the feedback capacitor elements CFB may be adapted to achieve an optimum switching and integration behavior of the low-noise amplifier unit 101.

Figure 2:
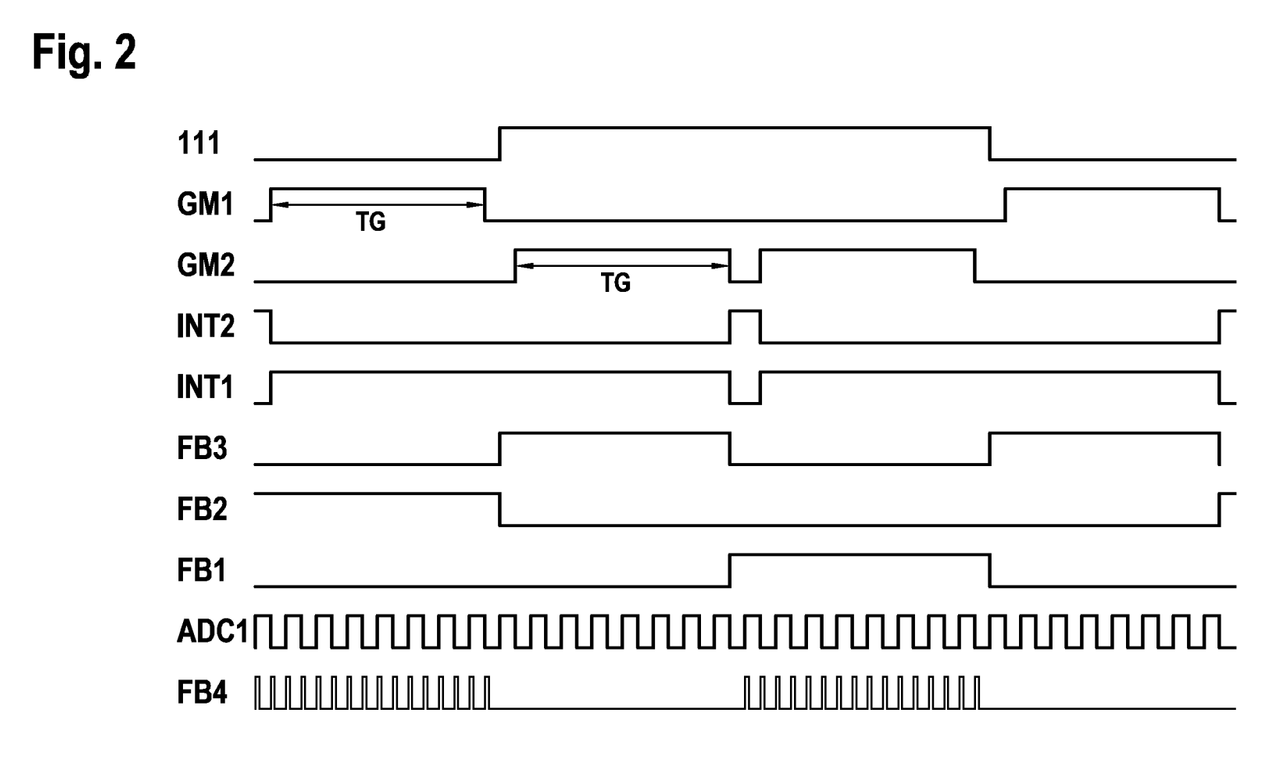
FIG. 2 shows a time graph of a timing diagram for the analog frontend architecture according to the specific embodiment of FIG. 1.

FIG. 2 shows a time graph of the timing diagram for the analog frontend architecture 100 of the specific embodiment of FIG. 1.

FIG. 2 shows a switching behavior of the driver 111, the first and second demodulator switching elements GM1, GM2, the first and second integrator switching elements INT1, INT2, the first to fourth feedback switching elements FB1, FB2, FB3, FB4 and the converter switching element ADC1. Via the corresponding interconnection of the first and second demodulator switching elements GM1, GM2 and the first and second integrator switching elements INT1, INT2, a boxcar integration of the charge of the sensor signals of the capacitive pressure sensor 109 which is fed into the first and second input terminals INP, INN may be achieved. Via the corresponding interconnection of the first to third feedback switching elements FB1, FB2, FB3, the respective feedback of the feedback unit 107, in which altered signals are fed back into the input terminals of the analog frontend architecture 100 proportionally to the output charge signals of the second integrator unit 105, may be modulated based on the amplification behavior according to the boxcar integration technique. Via the fourth feedback switching element FB4, any negative influence of the high-frequency sampling of the analog-digital converter ADC, which is achieved via the corresponding interconnection of the converter switching elements ADC1, may be reduced or prevented by matching the switching pattern of the fourth feedback switching elements FB4 to the switching pattern of the converter switching elements ADC1 of the high-frequency sampling of the analog-digital converter ADC. Whilst the converter switching elements ADC1 sample the first and second output terminals OUT1, OUT2 of the low-noise amplifier unit 101 whilst the feedback unit 107 communicates, in particular, with the first input terminal INP and the second output terminal OUT2 via CFB, OUT1, the fourth feedback switching elements FB4 must, in particular, be opened for a very short time.

The switching behavior shown here of the illustrated switching elements is merely exemplary in nature and does not describe an actual switching behavior of the analog frontend architecture 100 according to the invention.

Figure 3:
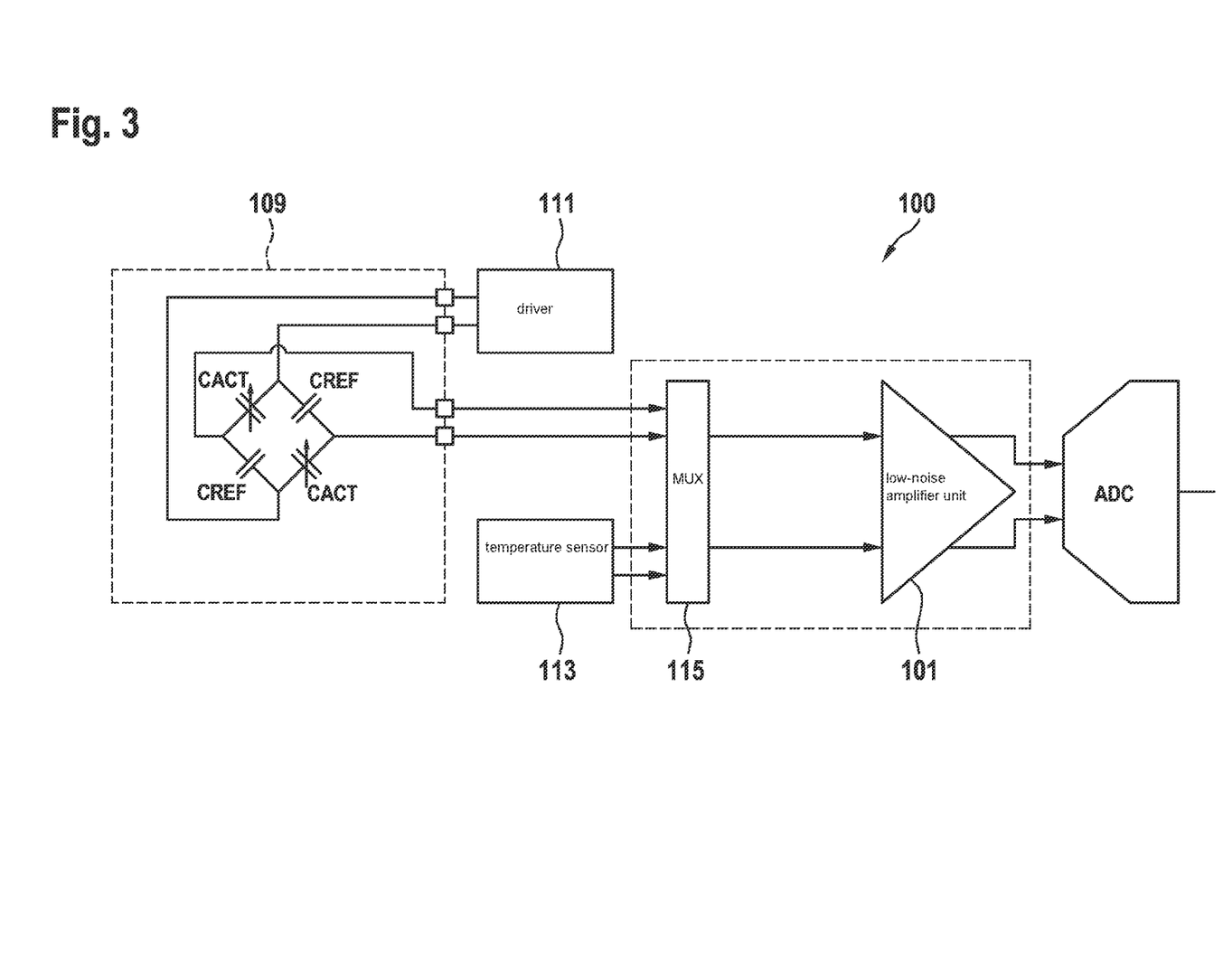
FIG. 3 shows a further schematic illustration of the analog frontend architecture according to a further specific embodiment of the present invention.

FIG. 3 shows a further schematic illustration of the analog frontend architecture 100 according to a further specific embodiment.

FIG. 3 shows a simplified illustration of a specific embodiment of the analog frontend architecture 100 in FIG. 1. The details illustrated in FIG. 1 of the analog frontend architecture 100 are not illustrated in FIG. 3 and the components of the analog frontend architecture 100 are merely limited to the low-noise amplifier unit 101 in FIG. 3. In the specific embodiment in FIG. 3, the low-noise amplifier unit 101 may comprise all of the components illustrated in FIG. 1.

In the illustrated specific embodiment, the analog frontend architecture 100, in particular the low-noise amplifier unit 100, is connected to a capacitive pressure sensor 109 and an analog-digital converter ADC, analogously to FIG. 1. The capacitive pressure sensor 109 is in turn connected to a driver 111 and is designed as a capacitive Wheatstone bridge with two sensor capacitor elements CACT and two reference capacitor elements CREF.

Deviating from the specific embodiment in FIG. 1, the analog frontend architecture 100 in the specific embodiment shown furthermore comprises a multiplexer unit 115. Moreover, the analog frontend architecture 100 is connected to a temperature sensor 113. In the specific embodiment shown, the sensor signals of the capacitive pressure sensor 109 and the sensor signals of the temperature sensor 113 arrive at the multiplexer unit 115. Via the multiplexer unit 115, therefore, the sensor signals of the capacitive pressure sensor 109 and also the sensor signals of the temperature sensor 113 may be amplified by the analog frontend architecture 100 according to a timing diagram and processed accordingly. The sensor signals of the capacitive pressure sensor 109 and the sensor signals of the temperature sensor 113 are introduced into the analog frontend architecture 100 as corresponding charge signals, the charge signals of the capacitive pressure sensor 109 being proportional to the measured pressure and the charge signals of the temperature sensor 113 being proportional to the measured temperature.

Figure 4:
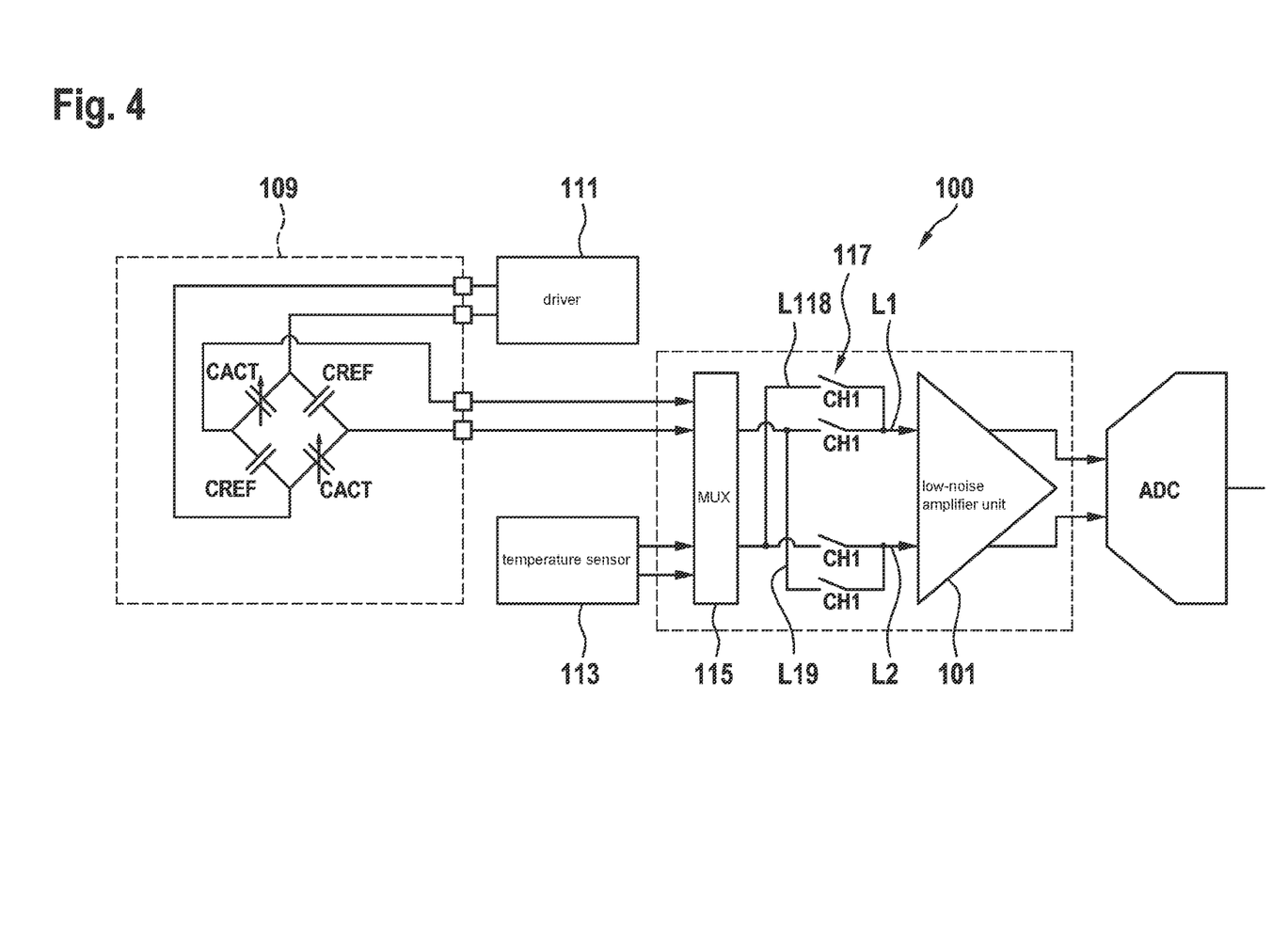
FIG. 4 shows a further schematic illustration of the analog frontend architecture according to a further specific embodiment of the present invention.

FIG. 4 shows a further schematic illustration of the analog frontend architecture 100 according to a further specific embodiment.

FIG. 4 is based on the specific embodiment in FIG. 3 and comprises all features illustrated therein. In FIG. 4, the analog frontend architecture 100 furthermore comprises a double sampling unit 117. The double sampling unit 117 is connected to both the low-noise amplifier unit 101 and the multiplexer unit 115 via the first line L1 and the second line L2. The double sampling unit 117 comprises four sampler switching elements CH1, of which one switching element is arranged in the first line L1 and one switching element is arranged in the second line L2. A further sampler switching element CH1 is arranged in an eighteenth line L18, whilst the fourth sampler switching element CH1 is arranged in a nineteenth line L19. The eighteenth line L18 and the nineteenth line L19 each represent a cross connection between the first and second lines L1 L2. Double sampling of the sensor signals of the capacitive pressure sensor 109 and the sensor signals of the temperature sensor 113 may be carried out via the double sampling unit 117. In double sampling, the polarities of the respective sensor signals for two successive sampling clock pulses are changed in each case. Consequently, any remaining offset of the capacitive pressure sensor 109 or the temperature sensor 113 and the analog frontend architecture 100 may be corrected using corresponding double sampling techniques.

Figure 5:
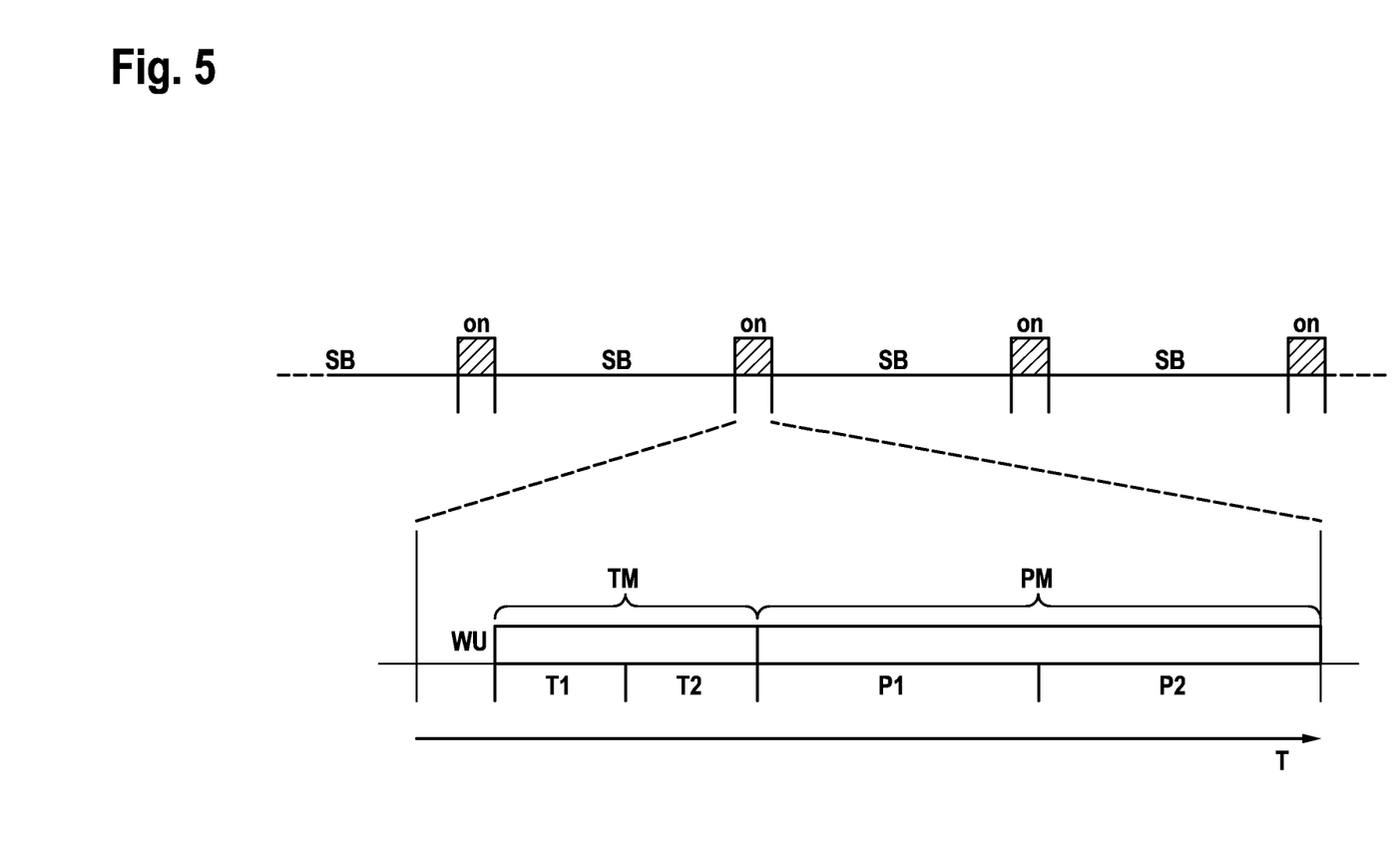
FIG. 5 shows a schematic illustration of a time sequence of a measuring behavior of a sensor system having the analog frontend architecture according to a specific embodiment of the present invention.

FIG. 5 shows a schematic illustration of a time sequence of a measuring behavior of a sensor system having the analog frontend architecture 100 according to a specific embodiment.

FIG. 5 shows a time sequence of a measuring behavior of the analog frontend architecture 100 of FIG. 4 with double sampling of sensor signals of the capacitive pressure sensor 109 and sensor signals of the temperature sensor 113. In the specific embodiment in FIG. 5, both the capacitive pressure sensor 109 and the temperature sensor 113 may be operated in a clocked operating mode by switching the sensors alternately between a standby mode SB and an operating mode ON. FIG. 5 shows the time sequence of a measuring behavior of the two sensors for a measuring phase of the sensor during the operating mode ON. According to the specific embodiment shown, the measuring phase firstly starts with a startup phase WU, in which the pressure and temperature sensors or the analog frontend architecture 100 are started for carrying out a measurement. In the specific embodiment shown, a temperature measurement TM is then carried out, followed by a pressure measurement PM. After completing the pressure measurement PM, the pressure and temperature sensors are switched back into standby mode SB. In the specific embodiment shown, the temperature measurement TM comprises a first temperature measurement T1 and a second temperature measurement T2. The pressure measurement PM comprises a first pressure measurement P1 and a second pressure measurement P2. The first and second temperature measurements T1, T2 and the first and second pressure measurements P1, P2 here are recorded with a different polarity according to the double sampling technique, so that the voltage signals of the first temperature measurement T1 and the voltage signals of the second temperature measurement T2 have opposite polarities and the voltage signals of the first pressure measurement P1 and the voltage signals of the second pressure measurement P2 have opposite polarities. By comparing the voltage signals of the first and second temperature measurement T1, T2 and the voltage signals of the first and second pressure measurement P1, P2, offset corrections of the temperature sensor 113 and the respective pressure sensor 10 may be performed. The temperature and pressure measurements here may be carried out in such a way that the two measurements do not influence each other.

What is claimed is:

1. An analog frontend architecture for a capacitive pressure sensor, comprising:
   a low-noise amplifier unit configured for low-noise amplification of sensor signals of the capacitive pressure sensor, wherein the low-noise amplifier unit includes a first integrator unit and a second integrator unit, wherein the first integrator unit is connected to input terminals of the low-noise amplifier unit, is configured as a boxcar integrator, and is configured to amplify sensor signals of the capacitive pressure sensor according to a boxcar integration technique, and wherein the second integrator unit is connected to output terminals of the low-noise amplifier unit and is configured to integrate the amplified voltage signals of the first integrator unit;

wherein the low-noise amplifier unit is configured in a closed loop architecture and includes a feedback unit, which is configured to feed a charge proportionally to amplified voltage signals from the second integrator unit back into input terminals of the low-noise amplifier unit.

2. The analog frontend architecture as recited in claim 1, wherein the feedback unit includes at least one feedback switching element, wherein, via the feedback switching element, an influence of a high-frequency sampling of an analog-digital converter connected to an output of the low-noise amplifier unit may be suppressed.

3. The analog frontend architecture as recited in claim 1, wherein the feedback unit includes at least one feedback capacitor element, wherein, via the feedback capacitor element, the voltage signals of the second integrator unit, which are amplified back into the low-noise amplifier unit, may be matched to voltage signals of a capacitive pressure sensor connected to the input terminals of the low-noise amplifier unit.

4. The analog frontend architecture as recited in claim 1, wherein the first integrator unit includes a transconductor, and wherein the second integrator unit includes an operative transconductor amplifier.

5. The analog frontend architecture as recited in claim 1, wherein the first integrator unit includes a demodulator unit having a multiplicity of demodulator switching elements and at least one integrator capacitor element, and wherein the first integrator unit is connected to the second integrator unit via the integrator capacitor element.

6. The analog frontend architecture as recited in claim 1, further comprising:
a multiplexer unit connected to the low-noise amplifier unit, wherein sensor signals of a temperature sensor may be fed into the analog frontend architecture via the multiplexer unit.

7. The analog frontend architecture as recited in claim 1, further comprising:
a double sampling unit having a multiplicity of sampler switching elements, wherein it is possible to change polarity between output terminals of the capacitive pressure sensor and the input terminals of the low-noise amplifier unit via the double sampling unit.

8. The analog frontend architecture as recited in claim 1, wherein the analog frontend architecture is operable continuously or with a configurable operating duty cycle.

9. The analog frontend architecture as recited in claim 1, wherein the analog frontend architecture is compatible with a capacitive MEMS pressure sensor with a full capacitive Wheatstone bridge or with a half capacitive Wheatstone bridge or with a single active capacitance, and with or without a reference capacitance.

* * * * *